(12) United States Patent
Coruzzi et al.

(10) Patent No.: US 12,262,651 B1
(45) Date of Patent: *Apr. 1, 2025

(54) HAND TILLER

(71) Applicant: SPINTILLER CULTIVATOR, LLC, Wilmington, DE (US)

(72) Inventors: Ronald A. Coruzzi, Wilmington, DE (US); Christopher A. Nowell, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/394,279

(22) Filed: Dec. 22, 2023

Related U.S. Application Data

(63) Continuation of application No. 18/201,737, filed on May 24, 2023, now Pat. No. 11,871,688.

(60) Provisional application No. 63/349,735, filed on Jun. 7, 2022.

(51) Int. Cl.
   *A01B 1/10* (2006.01)
   *A01B 1/14* (2006.01)

(52) U.S. Cl.
   CPC . *A01B 1/14* (2013.01); *A01B 1/10* (2013.01)

(58) Field of Classification Search
   CPC .... A01B 1/00; A01B 1/10; A01B 1/12; A01B 1/14; A01B 1/24
   USPC ........................................ 172/371, 540, 548
   See application file for complete search history.

(56) References Cited

U.S. PATENT DOCUMENTS

| | | | |
|---|---|---|---|
| 4,094,363 A | 6/1978 | McCoomb | |
| 4,364,437 A | 12/1982 | Haapala | |
| D273,656 S | 5/1984 | Dellinger | |
| 4,678,043 A | 7/1987 | vom Braucke et al. | |
| 7,735,573 B2 | 6/2010 | Catalano | |
| 8,033,341 B2 | 10/2011 | Catalano | |
| D651,054 S | 12/2011 | Alex | |
| D868,552 S | 12/2019 | Magana et al. | |
| 11,871,688 B1 * | 1/2024 | Coruzzi | A01B 1/10 |

FOREIGN PATENT DOCUMENTS

| | | |
|---|---|---|
| DE | 3435601 A1 | 4/1986 |
| GB | 2489395 A1 | 10/2012 |

* cited by examiner

*Primary Examiner* — Gary S Hartmann
(74) *Attorney, Agent, or Firm* — Invention To Patent Services; Alex Hobson

(57) ABSTRACT

A hand tiller has an elongated handle with a left tiller wheel and a right tiller wheel coupled to an axel and configured to rotate about the axel to till the ground. Each of the tiller wheels has a plurality of tines that have a curved geometry, wherein the tines curve circumferentially toward the extended end that is paddle shaped to more effectively penetrate the soil and lift the soil while tilling. Also, the tines taper toward the connected end. The tiller wheels are retained on the axel by tiller wheel retainers that couple with the axel, such as by being threaded into or onto the axel. The handle extends a handle length from the handle-end to the axel-end. The handle has a thumb flange on both the top side and bottom side to provide a resting place for a person's thumb when operating the hand tiller.

17 Claims, 6 Drawing Sheets

HAND TILLER

CROSS REFERENCE TO RELATED APPLICATIONS

This application is a continuation of U.S. patent application Ser. No. 18/201,737, filed on May 24, 2023, which claims the benefit of priority to U.S. provisional application No. 63/349,735, filed on Jun. 7, 2022; the entirety of which is hereby incorporated by reference herein.

BACKGROUND OF THE INVENTION

Field of the Invention

The invention relates to a hand tiller having an axel with left and right axel posts that are swept forward to cause the tiller wheel tines to be closer together when contacting the ground and curved tine blades that turn circumferentially from the connected end to the extended end.

Background

Hand tillers with multiple tiller wheels enable a larger area of the soil to be tilled than a hand tiller with a single tiller blade. These double tiller wheel hand tillers however often produce rows of tilled soil which in many cases is not desirable. A single trough may be desired for planting a plant in the single trough. Also, hand tillers are designed for operation in one direction and do not have handles to allow and support the hand when operating the hand tiller in an upside-down orientation. c

SUMMARY OF THE INVENTION

The invention is directed to a hand tiller that has an elongated handle with a left tiller wheel and a right tiller wheel coupled to an axel and configured to rotate about the axel to till the ground. Each of the tiller wheels has a plurality of tines that have a curved geometry, wherein the tines curve circumferentially toward the extended end. The extended end may be paddle shaped such as a curved chisel tip that lifts or penetrates the soil more efficiently with a lateral area of soil cultivation disturbance. Also, the tines taper toward the connected end of the tine, or where they are coupled with the tiller hub. The tiller wheels are retained on the axel by tiller wheel retainers that couple with the axel, such as by being threaded into or onto the axel. The handle extends a handle length from the handle-end to the axel-end. The handle has a thumb flange on both the top side and bottom side to provide a resting place for a person's thumb when operating the hand tiller. The thumb flange extends up to prevent the thumb from sliding forward when pushing the hand tiller down into the ground.

The handle and axel may be a one-piece unit, or monolith part being made from a single piece of material, such as being molded or cast. In an exemplary embodiment, the handle and axel are cast metal, such as aluminum to provide effective support and rigidity for tilling the ground.

The exemplary handle has a thumb flange on both a top side and bottom side of the handle to retain the thumb thereon and prevent the thumb and hand from sliding forward when pushing down on the handle to till the soil. The top side and bottom side of the handle may be symmetric in geometry, with the thumb flange being the same shape and being configured the same offset distance from the handle-end of the handle.

The axel is configured with a left axel post and a right axel post that extend in opposing directions from the axel hub and are swept forward to cause the tiller wheel tines to be closer together when contacting the ground. Each of the left axel post and a right axel post extend along a post axis that is at an offset angle from an orthogonal axis, an axis that is orthogonal to the handle axis. Put another way, the two axel posts are rotated forward from the handle having an inclusive angle that is 180 degrees or less, such as 175 degrees or less, about 170 degrees or less, about 165 degrees or less, about 160 degrees or less, about 150 degrees or less, about 140 degrees or less and any range between and including the values provided. This geometry causes the tines of the tiller wheels to be closer together when they contact the ground which has been surprising discovered to improve forming a single trough by tilling. This swept forward geometry of the axel posts produces a distal tine gap, the distance between the extended ends of the tines distal the handle-end of the handle, which is less than the proximal tine gap, the distance between the extended end of the tines most proximal the handle-end of the handle.

Each of the left tiller wheel and the right tiller wheel has a plurality of tiller wheel tines that extend radially outward from the tiller wheel hub. The tiller wheels may have three or more tines, four or more tines, five or more tines, six or more tines, eight or more tines and any range between and including the number of tines provided. Each tiller wheel tine has a tine length from a connected end, connected to the tiller wheel hub, to an extended end. The tiller wheel tine length may be about two inches or more, about three inches or more, about four inches or more, about four inches or less, about five inches or less. The tines of the tiller wheel form a rotational diameter that is a diameter traced by the extended ends of the tines as they rotate, which may be about ten inches or less, about eight inches or less, about six inches or less, about five inches or less and any range between and including the rotational diameter provided.

Each tine has a tined curved portion that is a curve in the tine from a radial direction to a circumferential direction. This tine curved portion extending to the extended end of the tine provides more effective tilling. This tine curved portion may begin about half way or more along the length of the tine from the axel-end of the tine. This curve may be progressive, wherein the radius of curvature is decreased along the tine toward the extended end of the tine. The tine may curve along the entire length of the tine of substantially along the length of the tine, such as along at least 50% or more of the length, or at least 75% or more of the length. Also, the tine curved portion causes the tine to extend over a curve offset angle, the angle from a line extending radially from the connected end of the tine to the extended end of the tine. The curve offset angle may be five degrees or more, ten degrees or more, fifteen degrees or more, twenty degrees or more and any range between and including the angles provided. The tine curve portion cause tine proximal the extended end to have a tip angle, wherein the tip angle is the angle from a line drawn tangent to the extended end of the tine to the radial direction or line extending radially outward from the center of the tiller wheel hub. The tip angle may be five degrees or more, ten degrees or more, fifteen degrees or more, twenty degrees or more and any range between and including the angles provided.

The tines of the tiller wheels may be paddle shaped at the extended end, wherein they have width that is about three times greater or more, about four times greater or more, about six times greater or more, or about ten times greater or more, than the thickness of the tine at the extended end.

The extended end of the tiller wheel may have opposing smooth top and bottom surfaces that may extend along a radius of curvature circumferentially a thickness offset distance from each other. This paddle geometry is important as it enables better lifting of the soil than a pointed tip tine on a tiller.

The tines of the tiller wheels may be tapered from the extended end to the connected end, wherein the extended end width is greater than the connected end width. The width at the extended end may be some percentage greater than the width of the tine at the connected end, such as about 10% or more, 20% or more, 30% or more, 50% or more, 100% or more, and any range between and including the percentages provided. This tapering geometry saves on weight and provides a wide contact or extended end width for moving more soil during tilling.

Each of the tiller wheels are retained on their respective axel post by a tiller wheel retainer. The tiller wheels may have a tiller wheel hub that extends over the axel post and the tiller wheel retainer may couple with the axel post and have a flange to prevent the tiller wheel from detaching from the axel post. Each tiller wheel may have an aperture that extends over the axel post. The tiller wheel retainer may have threads, such as male threads that are threaded into female threads in the end of the axel post. This threaded arrangement may be reversed however, with the tiller wheel retainer having female threads that thread over male threads on the end of the axel post.

The left and right tiller wheels may have the same geometries of the number of tines, tine curve portion geometry, tip angle and the like.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
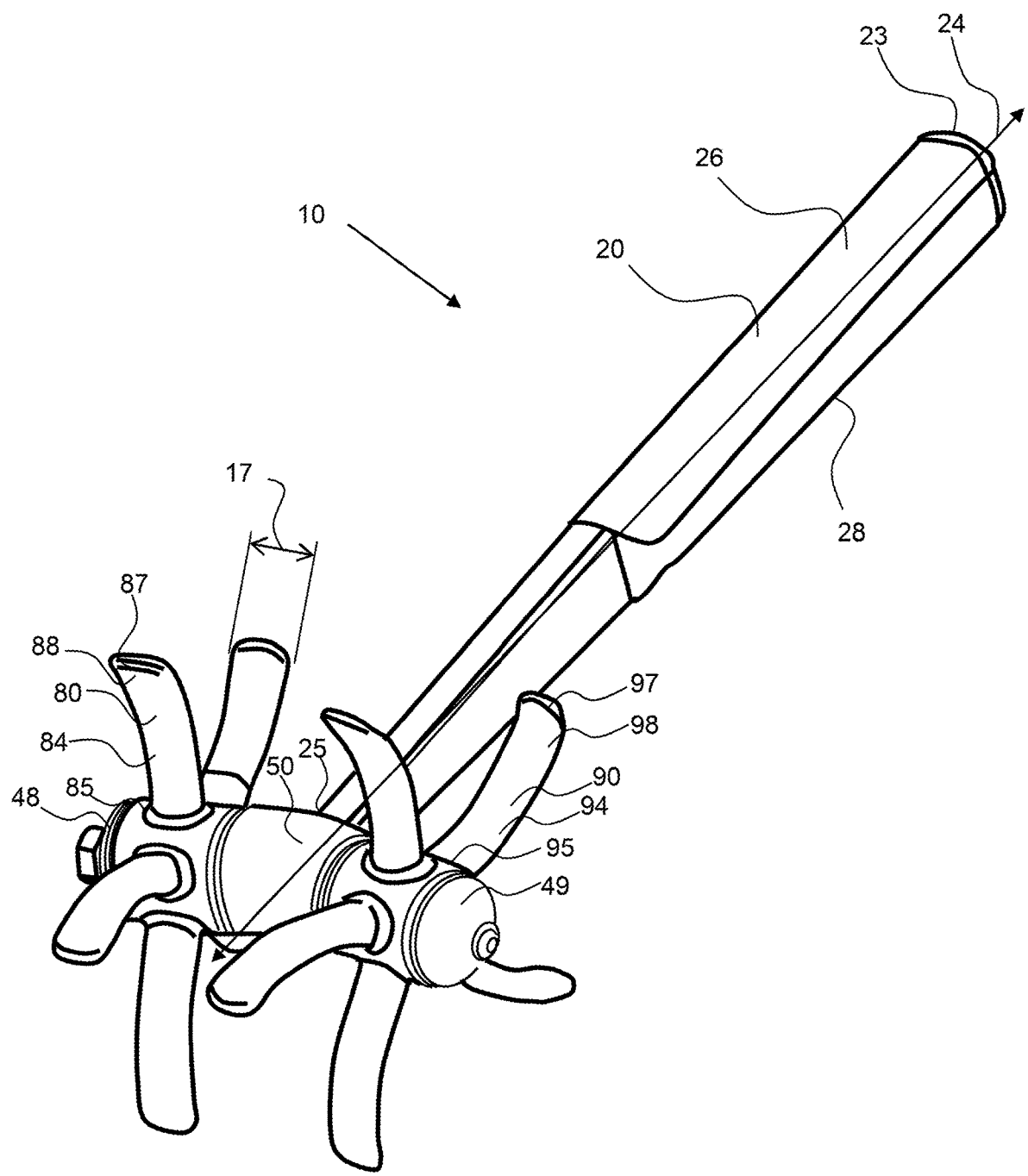
FIG. 1 shows a perspective view of an exemplary hand tiller having an elongated handle with a left and a right tiller wheel coupled to an axel and configured to rotate about the axel to till the ground.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
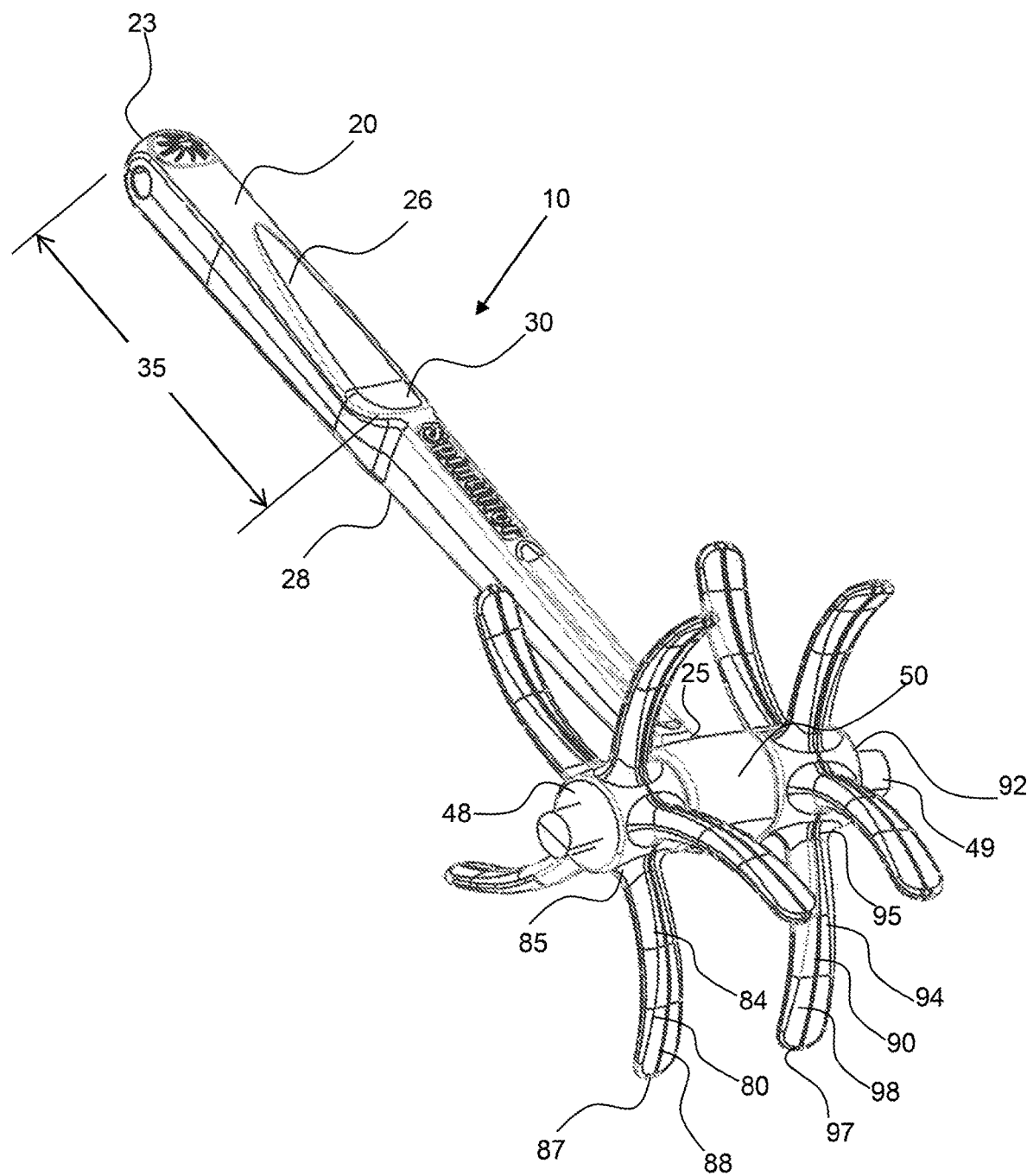
FIG. 2 shows a perspective view of the exemplary hand tiller shown in FIG. 1 and the two tiller wheels having a plurality of tines that have a curved portion that curves circumferentially toward the extend end of the tine.

Referring now to FIGS. 1 and 2, the exemplary hand tiller 10 has an elongated handle 20 with a left tiller wheel 90 and a right tiller wheel 80 coupled to an axel 50 and configured to rotate about the axel to till the ground. Each of the tiller wheels has five tines that have a curved geometry wherein they curve circumferentially toward the extended end. The tines are paddle shaped at the extended end, wherein they have a width 17 that is at least three times greater than the thickness of the tine. This paddle shaped geometry is important as it enables better lifting of the soil than a pointed tip tine on a tiller. Also, the tines taper toward the connected end of the tine, or where they are coupled with the tiller hub. The tiller wheels are retained on the axel by tiller wheel retainers 48, 49 that couple with the axel, such as by being threaded into or onto the axel. The handle 20 extends a handle length from the handle-end 23 to the axel-end 25. The handle has a thumb flange 30 on both the top side 26 and bottom side 28 to provide a resting place for a person's thumb when operating the hand tiller. The thumb flange extends up to prevent the thumb from sliding forward when pushing the hand tiller down into the ground. The thumb flange is configured an offset distance 35 from the handle end 23 of the handle 20.

The left tiller wheel 90 has five left tiller wheel tines 94 that extend radially outward from the left tiller wheel hub 92. Each of the left tiller wheel tines 94 have a tine length from a connected end 95, connected to the left tiller wheel hub 92, to an extended end 97. Each tine has a tined curved portion 98 that is a curve in the tine from a radial direction to a circumferential direction.

The right tiller wheel 80 has five right tiller wheel tines 84 that extend radially outward from the right tiller wheel hub 82. Each of the right tiller wheel tines 94 have a tine length from a connected end 85, connected to the right tiller wheel hub 82, to an extended end 87. Each tine has a tined curved portion 88 that is a curve in the tine from a radial direction to a circumferential direction.

Figure 3:
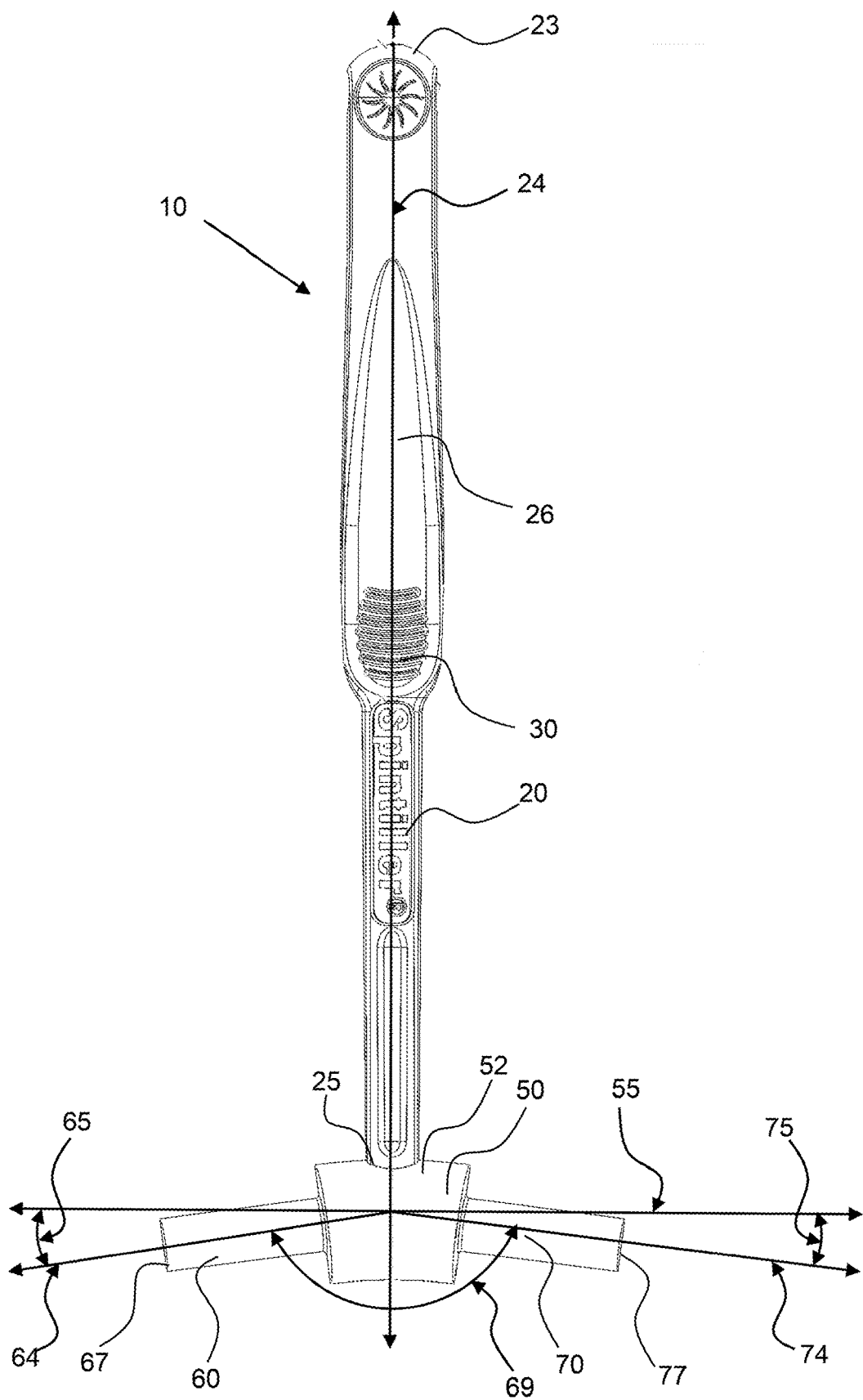
FIG. 3 shows a top view of an exemplary handle and axel with the axel having a left axel post and a right axel post that extend at an offset angle from orthogonal axis to the handle axis or an inclusive angle that is 175 degrees or less.
Figure 4:
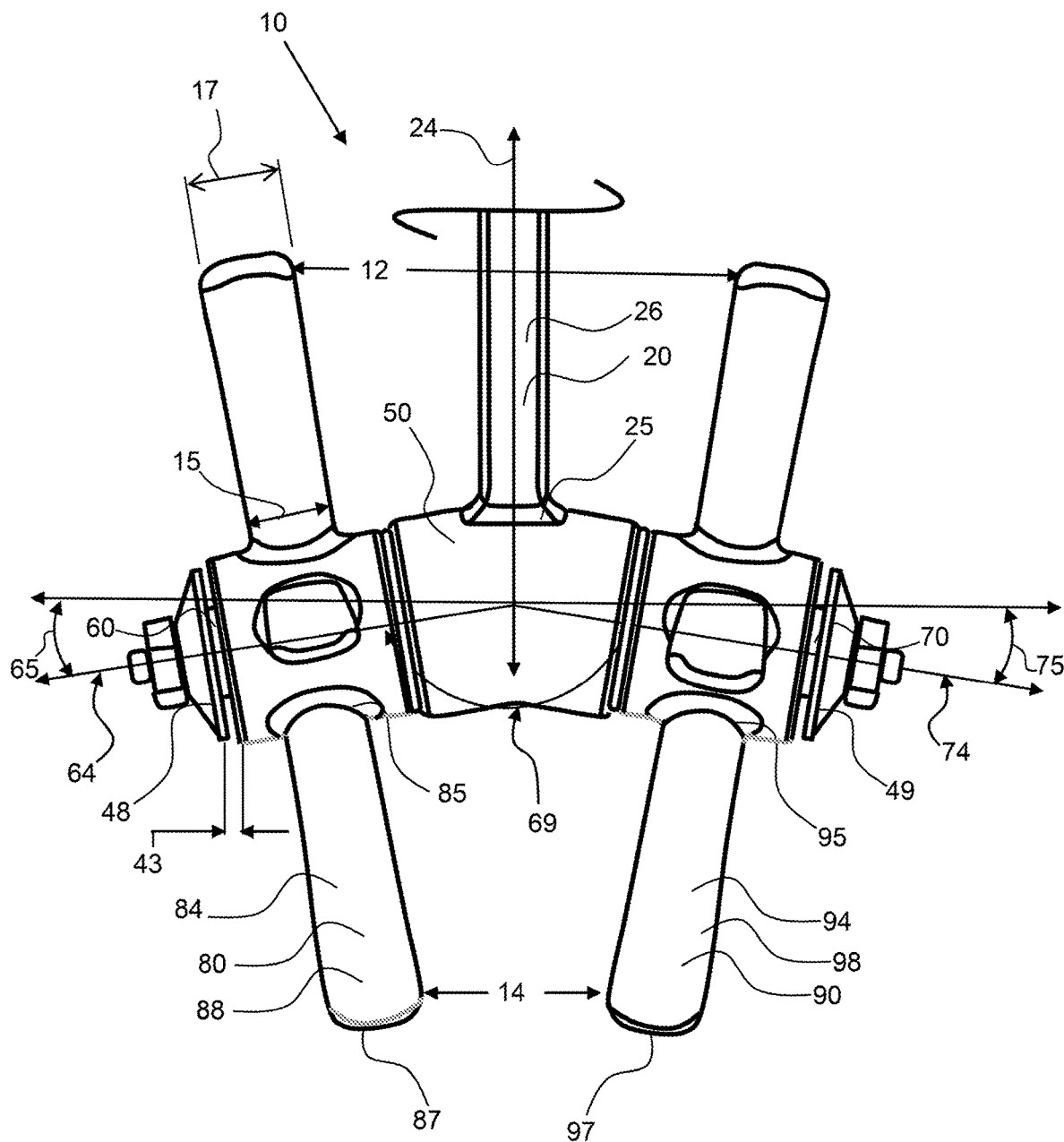
FIG. 4 shows a view of a portion of the exemplary hand tiller shown in FIG. 1 with the left and right tiller wheels retained on the left and right axel post, respectively, by tiller wheel retainers and the axel posts at offset angles such that the tines have gap distance distal from the handle-end of the handle that is less than the gap distance proximal to the handle-end of the handle.
Figure 5:
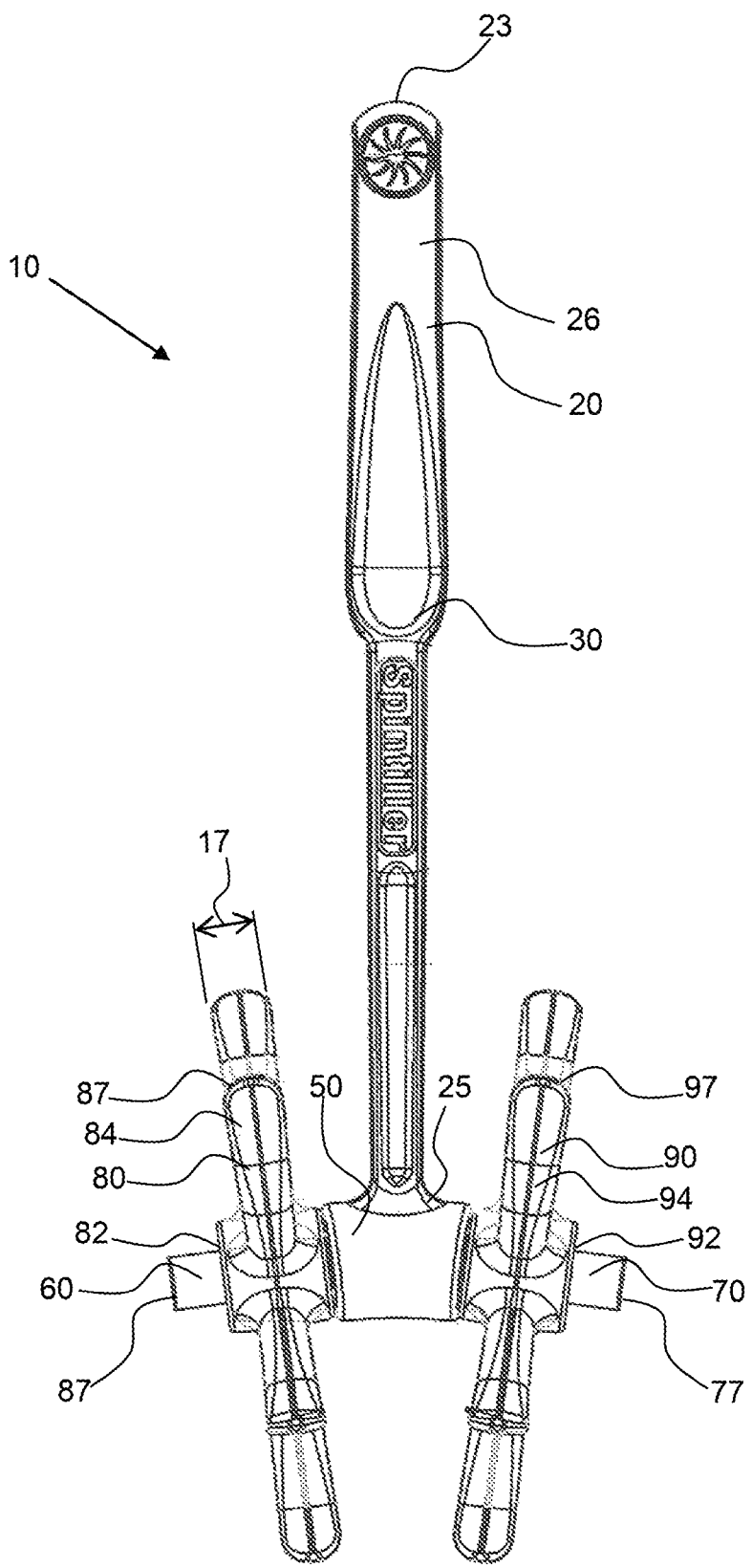
FIG. 5 shows a side view of the exemplary hand tiller shown in FIG. 2.

Referring now to FIGS. 3 to 5, the handle 20 and axel 50 are a one-piece unit, or monolith being made from a single piece of material, such as being molded or cast. In an exemplary embodiment, the handle and axel are cast metal, such as aluminum to provide effective support and rigidity for tilling the ground. The axel 50 has a left axel post 70 and a right axel post 60 that extend from the axel hub 52, along a post axis 74, 64, that is at an offset angle 75, 65, respectively, from an orthogonal axis 55, orthogonal to the handle axis 24. Put another way, the two axel posts are rotated forward from the handle having an inclusive angle 69 that is 175 degrees or less. This geometry causes the tines of the tiller wheels to be closer together, as shown in FIG. 4, when they contact the ground which has been surprising discovered to improve forming a single trough by tilling. The axel hub 52 is a portion of the axel coupled with the handle. The left axel post 70 extends to an extended end 77 and the right axel post 60 extends to an extended end 67 that may have a threaded portion, such as male threads about the post or an aperture with female threads.

As shown in FIG. 4, the distal tine gap 14, the distance between the extended ends of the tines when rotated to a position most distal the handle-end of the handle, is less than the proximal tine gap 12, the distance between the extended ends of the tines when most proximal the handle-end of the handle. As shown in FIG. 4, the right tiller wheel 80 is retained on the axel 50 by the right tiller wheel retainer 48. The right tiller wheel 80 has an aperture that extends over the right axel post 60 and the right tiller wheel retainer 48 is coupled with the right axel post and has a flange to retain the right tiller wheel 80 thereon. A retainer gap 43 is configured between the right tiller wheel retainer 48 and the right tiller wheel 80 to enable the right tiller wheel to deflect slightly for easier operation when tilling, especially when tilling in rocky soil. Likewise, the left tiller wheel 90 is retained on the axel 50 by the left tiller wheel retainer 48. The left tiller wheel 90 has an aperture that extends over the left axel post 70 and the left tiller wheel retainer 49 is coupled with the left axel post and has a flange to retain the left tiller wheel 90 thereon. A retainer gap is also formed between the left tiller wheel and the left tiller wheel retainer.

Also, as shown in FIG. 4, each tine tapers from the extended end to the connected end, wherein the extended end width 17 is greater than the connected end width 15. This geometry reduces weight of the tiller wheels and therefore the hand tiller 10, while providing a larger contact end of the tine for more effectively tilling soil.

As shown in FIG. 5, the right tiller wheel 80 is configured over the right axel post 60 and the left tiller wheel 90 is configured over the left axel post 70.

Figure 6:
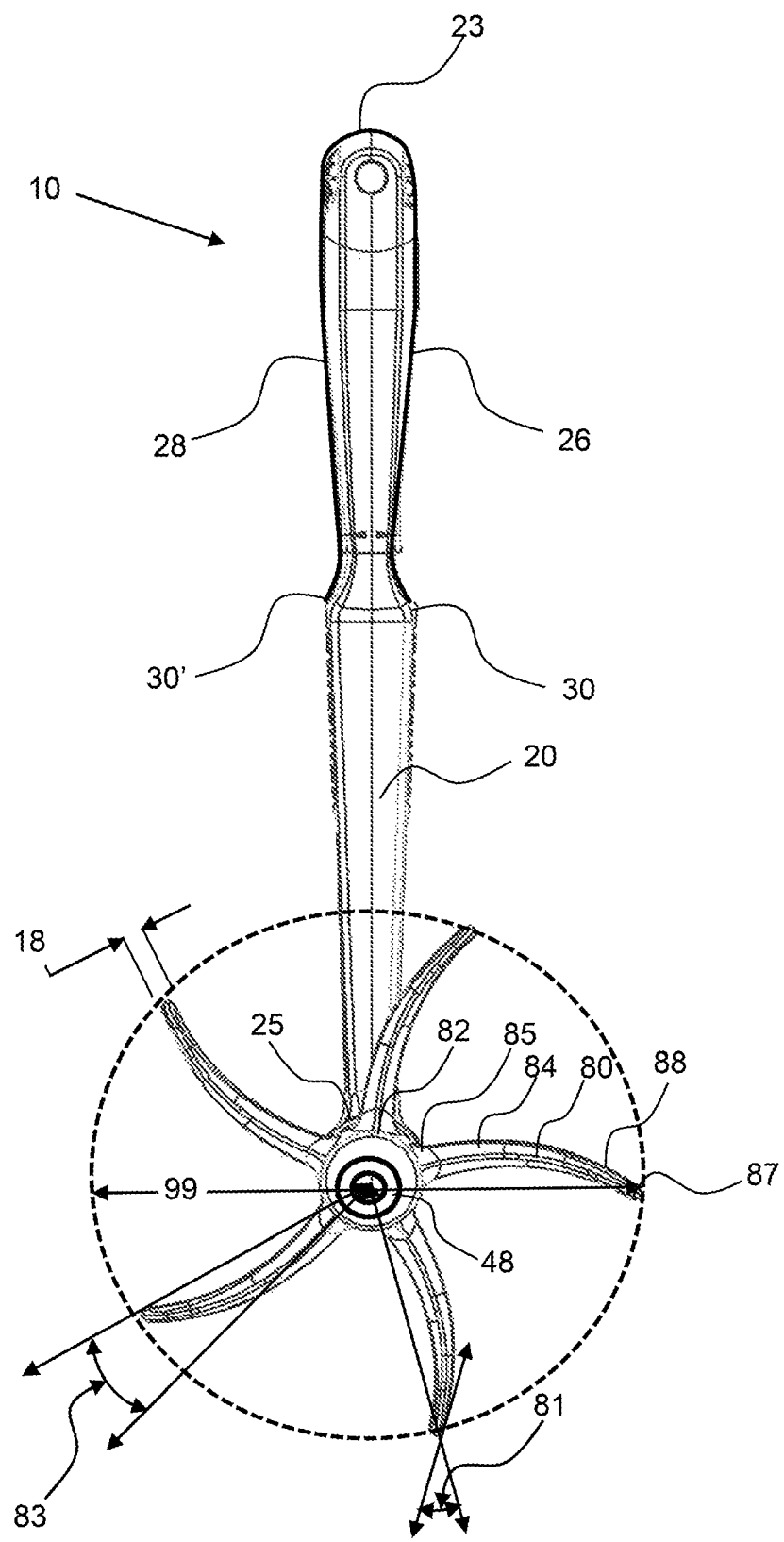
FIG. 6 shows a top view the exemplary hand tiller shown in FIG. 2.

As shown in FIG. 6, the hand tiller 10 has a handle that extends from the handle-end 23 to the axel-end 25 and has thumb flanges 30, 30' on the top side 26 and bottom side 28 of the handle 20. The right tiller wheel 80 is shown coupled to the axel. The right tiller wheel has five tines 84 that each extend a length from a connected end 85 to an extended end 87. The tines form a rotational diameter 99, formed by the rotation of the extended ends. Each tine has a tine curved portion 88, or portion that is curved from radial to circumferential toward the extended end. This tine curved portion extending to the extended end 87 of the tine provides more effective tilling. Also, this tine curved portion causes the tine to extend over a curve offset angle 83, the angle from a line extending radially from the connected end 85 of the tine to the extended end 87 of the tine. Also, this tine curve portion cause tine proximal the extended end to have a tip angle 81, wherein the tip angle is the angle from a line drawn tangent to the extended end of the tine to the radial direction or line extending radially outward from the center of the tiller wheel hub 82. The left tiller wheel may have the same geometries of the tip angle of the curve portion of the left tiller wheel.

Referring to FIGS. 5 and 6, the tines are paddle shaped at the extended end, wherein they have a width 17 that is at least three times greater than the thickness 18 of the tine at the extended end. This paddle geometry is important as it enables better lifting of the soil than a pointed tip tine on a tiller. The tines may also flare outward such that the width increase from the connected end 85 to the extended end 87. Put another way, the tines may taper in width from the extended end to the connected end, wherein the width at the extended end is about 10% or more, 20% or more, or even 30% or more the width of the tine at the connected end. As described herein, this saves on weight but provides a wide contact or extended end for moving more soil during tilling.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A hand tiller comprising:
   a) a handle comprising:
      i) a length from a tiller-end to a handle-end that is no more than fourteen inches;
      ii) a handle axis;
      iii) top side;
      iv) a bottom side;
      wherein the hand tiller is reversible wherein the top side and the bottom side of the handle each have a thumb flange;
   b) an axel configured on the tiller-end of the handle and comprising:
      i) a right axel post extending at and offset angle from the axel to an extended end;
      ii) a left axel post extending at and offset angle from the axel to an extended end;
      wherein the offset angle of the right axel post and left axel post is at least 10 degrees from orthogonal to the handle axis;
   c) a right tiller wheel comprising:
      i) a hub that extends over the right axel post;
      ii) tines extending radially outward from said hub;
   d) a right tiller wheel retainer that couples with the right axel post to retain the right tiller wheel on the right axel post;

e) a left tiller wheel comprising:
   i) a hub that extends over the left axel post;
   ii) tines extending radially outward from said hub;
f) a left tiller wheel retainer that couples with the left axel post to retain the left tiller wheel on the left axel post;
wherein each tine of the left tiller wheel and right tiller wheel have a tine portion, wherein the tine curves circumferentially proximal the extended end.

2. The hand tiller of claim 1, wherein each of the left tiller wheel and the right tiller wheel have four or more tines.

3. The hand tiller of claim 1, wherein each of the left tiller wheel and the right tiller wheel have five or more tines.

4. The hand tiller of claim 1, wherein the handle, and the axel are a one-piece unit.

5. The hand tiller of claim 4, wherein the top side of the handle has a raised thumb flange.

6. The hand tiller of claim 1, wherein the length of the tines of the left tiller wheel and right tiller wheel are no more than a third the length of the handle.

7. The hand tiller of claim 1, wherein the length of the tines of the left tiller wheel and right tiller wheel are no more than 5 inches.

8. The hand tiller of claim 1, wherein each of the left tiller wheel and right tiller wheel has a rotational diameter of no more than 8 inches.

9. The hand tiller of claim 1, wherein the tines of each of the left tiller wheel and the right tiller wheel curve circumferentially proximal the extended end.

10. The hand tiller of claim 1, wherein each tine has a tip angle of at least 10 degrees.

11. The hand tiller of claim 1, wherein each tine has a curve offset angle of at least 5 degrees.

12. The hand tiller of claim 1, wherein each tine has a width that tapers from the extended end to the connected end.

13. The hand tiller of claim 12, wherein each tine has an extended end width that is at least 10% greater than a connected end width.

14. The hand tiller of claim 1, further comprising a retainer gap configured between the right tiller wheel retainer and the right tiller wheel to enable the right tiller wheel to deflect slightly when tilling, and a retainer gap configured between the left tiller wheel retainer and the left tiller wheel to enable the left tiller wheel to deflect slightly when tilling.

15. The hand tiller of claim 14, wherein the retainer gap between the right tiller wheel retainer and the right tiller wheel is at least 0.125 in, and wherein the retainer gap between the left tiller wheel retainer and the left tiller wheel is at least 0.125 in.

16. The hand tiller of claim 1, wherein each of the tine has a paddle shape at the extended end with a width at the extended end that is at least three times greater than a thickness at the extended end.

17. The hand tiller of claim 1, wherein the handle, and the axel are cast metal.

* * * * *